Jan. 7, 1936. H. BÖHMER, JR., ET AL 2,027,299
GASKET CENTERING MEANS
Filed Feb. 10, 1934    4 Sheets-Sheet 1
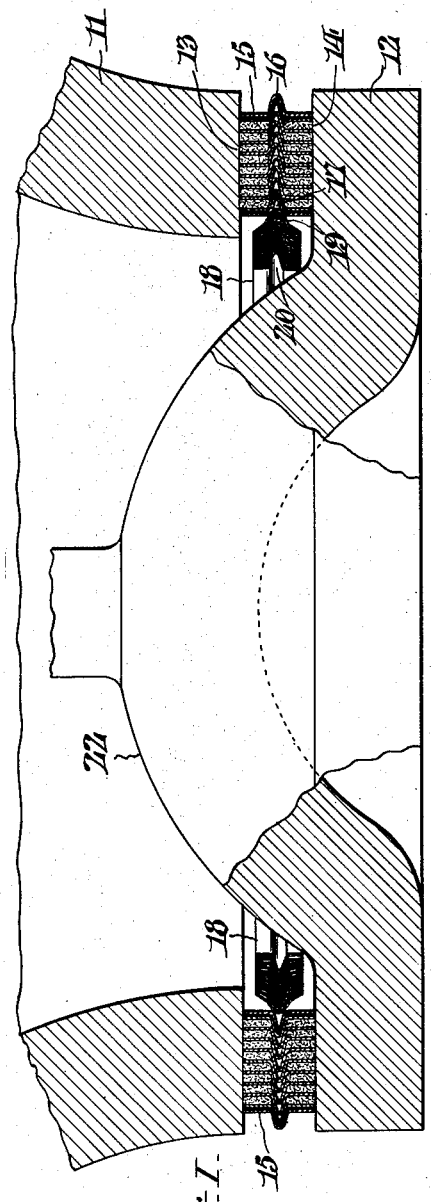
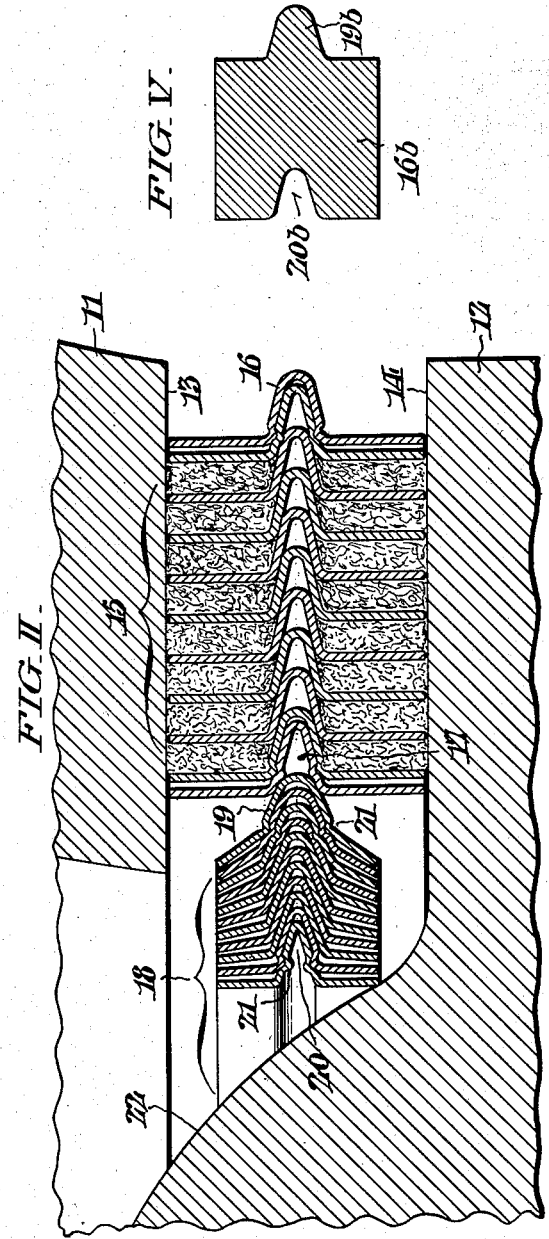

Jan. 7, 1936. H. BÖHMER, JR., ET AL 2,027,299
GASKET CENTERING MEANS
Filed Feb. 10, 1934 4 Sheets-Sheet 2
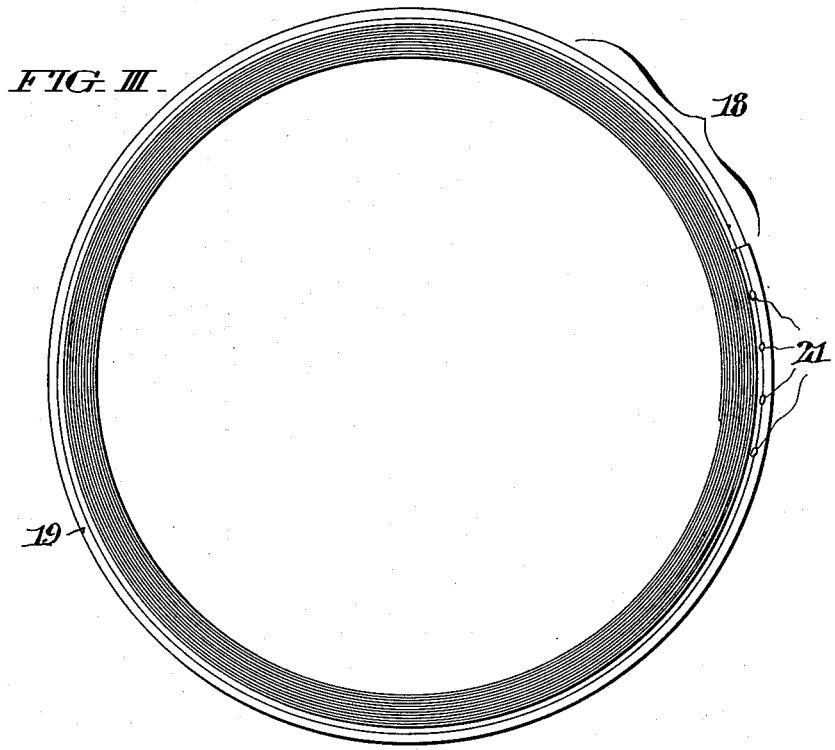
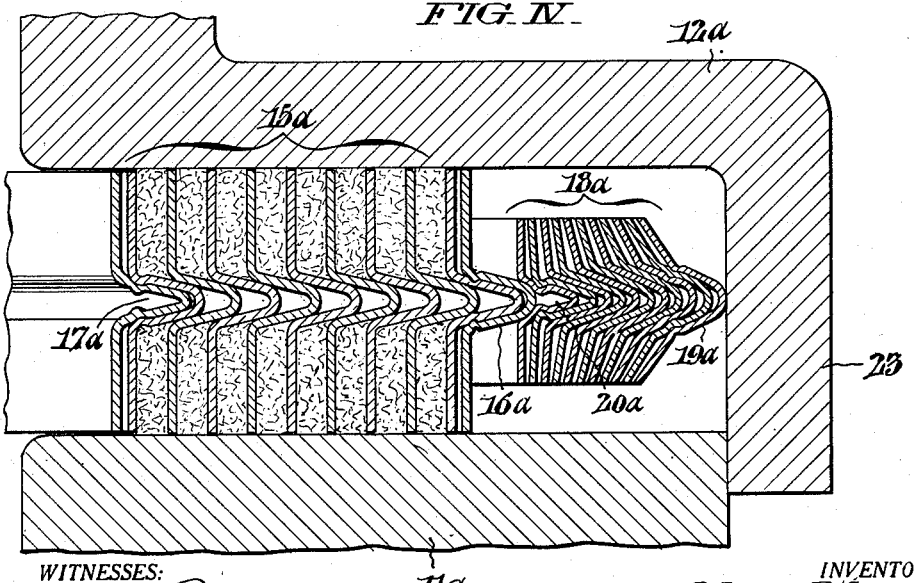

FIG. VI.
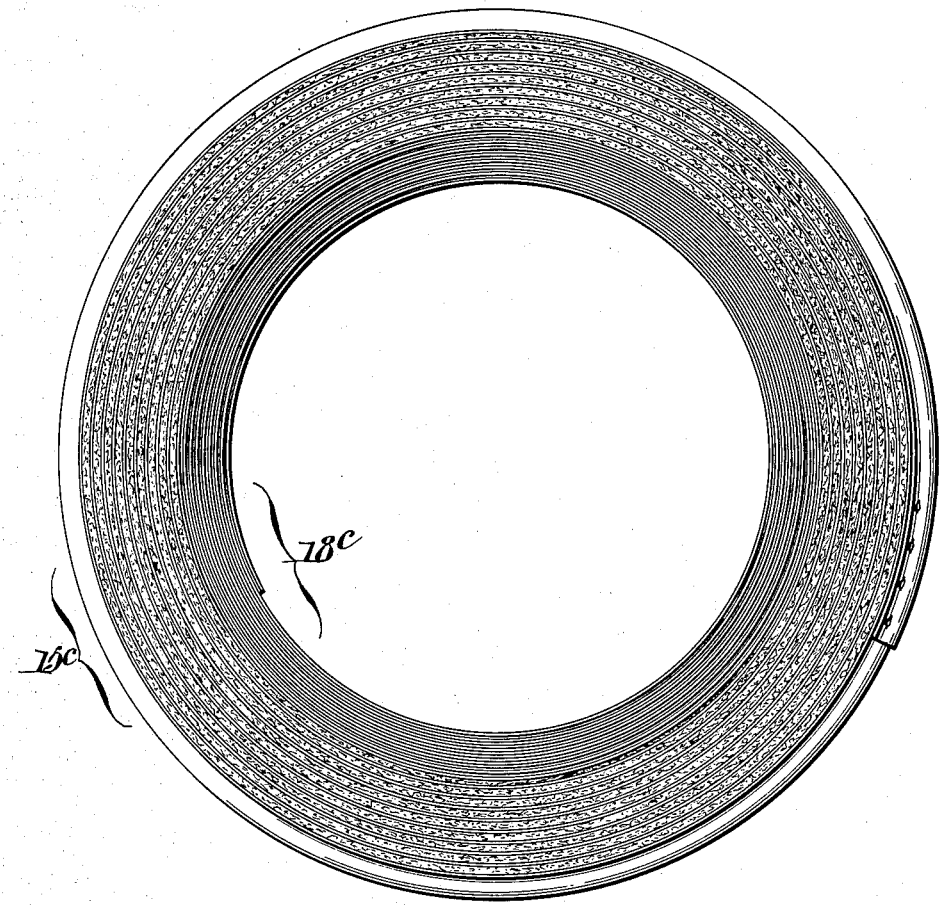
FIG. VII.
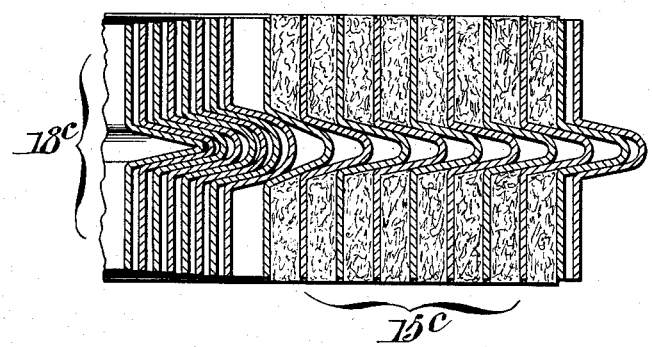

Jan. 7, 1936.  H. BÖHMER, JR., ET AL  2,027,299
GASKET CENTERING MEANS
Filed Feb. 10, 1934  4 Sheets-Sheet 4
FIG. VIII.
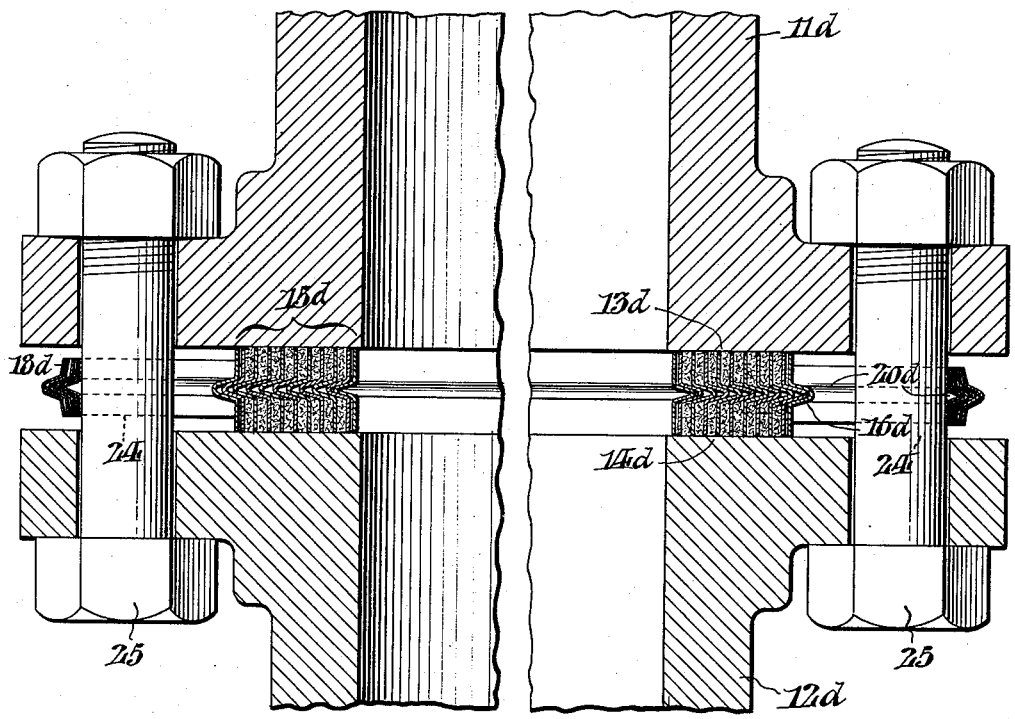
FIG. IX.
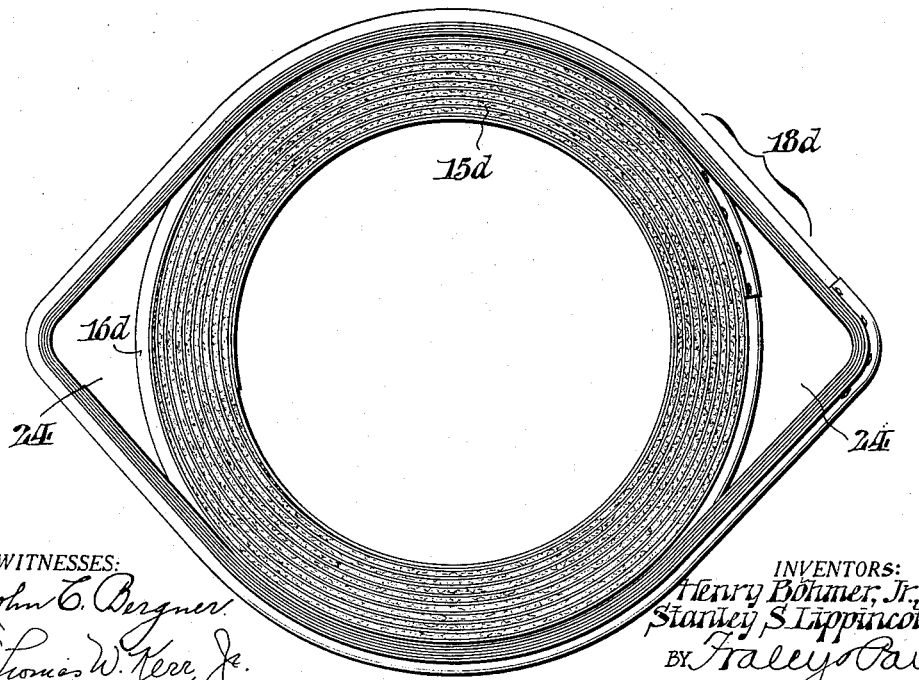

Patented Jan. 7, 1936

2,027,299

UNITED STATES PATENT OFFICE 2,027,299

GASKET CENTERING MEANS

Henry Böhmer, Jr., Woodbury Heights, and Stanley S. Lippincott, Palmyra, N. J., assignors to "Flexitallic" Gasket Co., Camden, N. J., a corporation of New Jersey Application February 10, 1934, Serial No. 710,738

6 Claims. (Cl. 288—1)

This invention relates to means for centering gaskets, and it has more particular reference to centering means for composite gaskets such as disclosed in U. S. Patent No. 1,829,709, granted October 27, 1931, to Henry Bohmer, Jr., one of the present applicants.

For maintenance of a reliable fluid tight seal it is absolutely essential that composite gaskets of the kind referred to lie wholly within the areas of the bearing surfaces of the joint parts between which the gaskets are interposed. Heretofore, the centering of the gaskets has been more or less a matter of guess work, and, through errors of judgment, they were often improperly placed with portions of their sealing faces exposed beyond the bearing surfaces of the joint parts. Thus, incident to drawing up the joint parts, shoulders were cut into the sealing faces of the gaskets which structurally weakened the latter and ultimately gave rise to leaks in the joints.

The chief aim of our invention is to overcome the above recited drawbacks, which desiderata we secure as hereinafter more fully set forth, through provision of a simple means adapted, by coaction with the joint parts during assembling of the same, to automatically center the gasket with its sealing faces wholly within the area of the opposing bearing surfaces of said joint parts. A further object of our invention is to attain the foregoing advantages in a centering means which lends itself to very economic manufacture either as a separate part capable of being readily attached to the gasket, or as an integral part of the gasket.

In the drawings, Fig. I is a fragmentary sectional view of a manhole structure showing, interiorly of a composite gasket interposed between the manhole cover and the edge of the manhole, a ring form of centering means conveniently embodying our invention.

Fig. II is a detail sectional view of part of the organization drawn to a magnified scale.

Fig. III is a plan view of the gasket centering ring featured in Figs. I and II.

Fig. IV is a view corresponding to Fig. II showing a different type of cover joint wherein the centering ring is used externally of the gasket.

Fig. V shows the cross section of a modified embodiment of our novel centering ring.

Fig. VI is a plan view of a composite gasket with the centering ring formed as an integral part thereof.

Fig. VII is a cross sectional view of the gasket of Fig. VI drawn to a magnified scale.

Fig. VIII is a fragmentary view of a gasketed pipe joint embodying still another modified embodiment of our novel centering means; and, Fig. IX is a plan view of the centering means illustrated in Fig. VIII.

With reference first to Figs. I, II and III of these drawings, the numeral 11 designates a manhole, and the numeral 12 a cover for the same, between the bearing surfaces 13 and 14 of which is interposed a composite annular gasket 15. As shown, this gasket 15 is produced by concurrently wrapping preformed centrally beaded tape metal and strips of non-metallic packing material after the manner disclosed in the patent hereinbefore referred to. As a result of the described construction, the gasket 15 is provided with an external circumferential projection 16 and an internal groove 17. Our novel centering means has in this case the form of a flexible ring 18, see Fig. III, it being fashioned by compactly wrapping pre-formed strip metal similar to that used in the construction of the gasket 15 but somewhat narrower, incident to which the longitudinal beads of contiguous convolutions are caused to snugly interlap and angularly-flare progressively-outwards, as clearly shown in Fig. II. Thus, like the gasket 15, the ring 18 is provided with a comparatively wide medial external circumferential projection 19, as well as with a substantially narrower medial internal circumferential groove 20. To prevent ravelling and spreading of the ring 18 in use, the ends of the metallic strip of which it is composed, may be permanently secured to the contiguous inner and outer convolutions either by soldering or welding, or by spot clinching the overlapping bead portions as at 21 in Figs. II and III. As shown, the ring 18 is made to such a diameter that it can be readily sprung into place within the gasket 15 with its peripheral bead projection 19 engaging the internal groove 17 of said gasket, and to such a width as to reach to the raised center portion 22 of the manhole cover 12. In applying the gasket 15 the same is placed, with the ring 18 attached, over the manhole cover 12 incident to which it is centered by coaction of the inner edge of the ring 18 with the raised axial portion 22 of said cover, and so held against shifting while the cover 12 is drawn up tight. The gasket 15 is thus positioned automatically with its sealing faces lying wholly within the area of the two opposing bearing faces 13 and 14 of the manhole structure. When so positioned, the gasket 15 is obviously protected from injury, with assurance against the development of leaks in the joint. By virtue of its diminutive thickness it will be observed that the centering ring 18 cannot become clamped between the bearing surfaces 13 and 14 of the manhole structure or in any way interfere with compression of the gasket 15 into effective sealing relation with said surfaces.

The centering ring indicated at 18a in Fig. IV is of the same construction as the ring 18, Figs. I–III, but made to a diameter for fitment around the outside of the gasket 15a, wth its internal groove 20a engaging the peripheral projection 16a of said gasket. The ring 18a is moreover made to a width such that it will reach to and coact, in its centering function, with a circumferential flange 23, of the joint part of 12a which telescopes over the joint part 11a.

If desired, the centering rings 18 and 18a of Figs. I–III and IV may be made to solid square cross section as shown at 16b in Fig. V with an external peripheral projection 19b and an internal circumferential groove 20b for interengagement respectively with the grooves 17, 17a, and projections 16, 16a of the gaskets 15, 15a, respectively. The ring 16b may moreover be split or made continuous, in which latter case the gasket 15 or 15a would be flexed in attaching it.

In Figs. VI and VII, the centering ring 18c is made as an integral part of the gasket 15c, that is to say: it is made by close wrapping of a continuous portion of the metallic strip which is incorporated in the body of said gasket, such strip portion being cut down or otherwise suitably narrowed as required.

In the modified embodiment illustrated in Figs. VIII and IX, the centering means has the form of a band 18d which is substantially elliptic in configuration, and, like the rings 18, 18a of Figs. I–III and IV, made as a wrapping of preformed strip metal. As shown, the central portion of the band 18d is curved for fitment about the gasket 15d with its internal medial groove 20d engaging the peripheral bead projection 16d of the gasket; while the extended end portions constitute symmetrically-disposed circumferentially spaced loops 24 beyond the periphery of the gasket 15d. As exemplified in Fig. VIII these loops 24 serve as eyes for passage of the securing bolts 25 whereby the two joint parts 11d and 12d are drawn together to clamp the gasket 15d fluid tight between their opposing bearing surfaces 13d and 14d. Obviously, through coaction of the bolts 25 with the loops 24 of the band 18d, the gasket 15d is accurately centered between the joint parts 11d and 12d. The band 18d may, if found expedient, be made integral with the gasket 15d after the manner described in connection with the modification of our invention shown in Figs. VI and VII, as will be obvious to those acquainted with the art.

The specific uses of our improved centering means and associated gaskets herein shown by way of exemplification, are of course to be considered as typical of many other instances of application in practice.

Having thus described our invention, we claim:

1. A centering means for gaskets having the form of a flexible ring composed solely of compactly-wrapped longitudinally-beaded strip metal, said wrapping causing the beading of contiguous convolutions to interlap and angularly-flare progressively outwards, and the ends of said strip being secured respectively to the engaging convolutions of the wrapping.

2. A centering means, for composite gaskets of the type described, having the form of a flexible ring composed solely of compactly-wrapped longitudinally-beaded continuous strip metal, said wrapping causing the beading of contiguous convolutions to snugly interlap and angularly-flare progressively outwards, and the ends of said strip being permanently secured respectively to the innermost and outermost engaging convolutions of the wrapping.

3. The combination with a gasket formed of spiralized longitudinally-beaded strip metal with non-metallic packing intervening its convolutions of a cencentric relatively-spaced centering means, such centering means being in the form of a flexible ring of less thickness than the gasket and composed solely of compactly-wrapped continuous convolutions of the strip metal aforesaid suitably reduced in width, said wrapping causing the beading of the contiguous convolutions to snugly interlap and angularly-flare progressively outwards, and the free end of said strip being permanently secured to the engaging convolution of the wrapping.

4. A gasket centering means in the form of a flexible ring composed solely of a compactly-wrapped strip of sheet metal, said ring being adapted to surroundingly-engage the gasket and embodying lateral-offsets defining inwardly-open loops at circumferential intervals beyond the periphery of the gasket for passage of securing means joining the parts between which the gasket is interposed.

5. The combination with a gasket formed of spiralized longitudinally-beaded strip metal with non-metallic packing intervening its convolutions of an integral centering means, such centering means being in the form of a flexible ring composed solely of compactly engaging continuous wrapping of the strip metal aforesaid, and said wrapping defining at circumferential intervals beyond the confines of the gasket lateral-loops of inwardly-open angular-formation for passage of securing bolts joining the parts between which the gasket is clamped.

6. As a new article of manufacture a centering means for flat composite-annular gaskets in the form of a substantially oval band of square cross-section with a central perimetric bead externally thereof and a peripheral groove medially of the inner periphery thereof, said band being adapted to engage over the gasket with provisions beyond the periphery of the latter of loops for engaging bolts joining the parts between which the gasket is clamped.

HENRY BÖHMER, Jr.
STANLEY S. LIPPINCOTT.